(12) United States Patent
Ando et al.

(10) Patent No.: US 11,521,641 B2
(45) Date of Patent: Dec. 6, 2022

(54) MODEL LEARNING DEVICE, ESTIMATING DEVICE, METHODS THEREFOR, AND PROGRAM

(71) Applicant: NIPPON TELEGRAPH AND TELEPHONE CORPORATION, Chiyoda-ku (JP)

(72) Inventors: Atsushi Ando, Yokosuka (JP); Hosana Kamiyama, Yokosuka (JP); Satoshi Kobashikawa, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 678 days.

(21) Appl. No.: 16/484,053

(22) PCT Filed: Feb. 2, 2018

(86) PCT No.: PCT/JP2018/003644
§ 371 (c)(1),
(2) Date: Aug. 6, 2019

(87) PCT Pub. No.: WO2018/147193
PCT Pub. Date: Aug. 16, 2018

(65) Prior Publication Data
US 2019/0392348 A1  Dec. 26, 2019

(30) Foreign Application Priority Data
Feb. 8, 2017  (JP) .............................. JP2017-020999

(51) Int. Cl.
*G10L 25/63* (2013.01)
*G06N 20/00* (2019.01)
(Continued)

(52) U.S. Cl.
CPC .............. *G10L 25/63* (2013.01); *G06F 40/20* (2020.01); *G06N 7/005* (2013.01); *G06N 20/00* (2019.01);
(Continued)

(58) Field of Classification Search
None
See application file for complete search history.

(56) References Cited

U.S. PATENT DOCUMENTS

2010/0332287 A1* 12/2010 Gates ..................... G06Q 30/02
379/265.09
2012/0011158 A1* 1/2012 Avner ..................... G06F 40/30
707/777

(Continued)

OTHER PUBLICATIONS

Engelbrecht, Klaus-Peter, et al. "Modeling user satisfaction with hidden Markov models." Proceedings of the SIGDIAL 2009 Conference. 2009. (Year: 2009).*

(Continued)

*Primary Examiner* — Douglas Godbold
(74) *Attorney, Agent, or Firm* — Oblon, McClelland, Maier & Neustadt, L.L.P.

(57) ABSTRACT

State-of-satisfaction change pattern models each including a set of transition weights in state sequences of the states of satisfaction are obtained for predetermined change patterns of the states of satisfaction, and a state-of-satisfaction estimation model for obtaining the posteriori probability of the utterance feature amount given the state of satisfaction of an utterer is obtained by using the utterance-for-learning feature amount and a correct value of the state of satisfaction of an utterer who gave an utterance for learning corresponding to the utterance-for-learning feature amount. By using the input utterance feature amount and the state-of-satisfaction change pattern models and the state-of-satisfaction estimation model, an estimated value of the state of satisfaction of (Continued)

an utterer who gave an utterance corresponding to the input utterance feature amount is obtained.

9 Claims, 6 Drawing Sheets

(51) Int. Cl.
*G06N 7/00* (2006.01)
*G06Q 30/00* (2012.01)
*G10L 15/10* (2006.01)
*G10L 15/22* (2006.01)
*G06F 40/20* (2020.01)

(52) U.S. Cl.
CPC ............ *G06Q 30/016* (2013.01); *G10L 15/10* (2013.01); *G10L 15/22* (2013.01)

(56) References Cited

U.S. PATENT DOCUMENTS

| | | | |
|---|---|---|---|
| 2012/0101808 A1* | 4/2012 | Duong-Van | G06F 40/30 704/9 |
| 2016/0350651 A1* | 12/2016 | Devarajan | G06F 40/30 |
| 2017/0102765 A1* | 4/2017 | Yoneda | G06Q 30/0623 |
| 2017/0277993 A1* | 9/2017 | Beaver | G06Q 30/0201 |
| 2017/0278067 A1* | 9/2017 | Cunico | G06V 40/20 |
| 2018/0165582 A1* | 6/2018 | Cha | G06F 40/30 |
| 2018/0197088 A1* | 7/2018 | Bonin | G06N 5/025 |

OTHER PUBLICATIONS

International Search Report dated Apr. 17, 2018 in PCT/JP2018/003644 filed Feb. 2, 2018.

Park, Y. et al., "Towards Real-Time Measurement of Customer Satisfaction Using Automatically Generated Call Transcripts," in Proceedings of the 18$^{th}$ ACM conference on Information and knowledge management, RC24754 (W0902-116) Feb. 27, 2009, pp. 1387-1396.

Nomoto, N. et al., "Using nonverbal information and characteristic linguistic representations to detect anger emotion in dialog speech," The transactions of the Institute of Electronics, Information and Communication Engineers, vol. J96-D., No. 1, 2013, pp. 15-24 (with partial English translation).

Tokuda, K., "State-of-the-art Technology of Speech Information Processing: Speech Recognition and Speech Synthesis based on Hidden Markov Models", IPSJ Magazine, vol. 45, No. 10, 2004, pp. 1005-1011 (with partial English translation).

Shikano, K. et al., "Speech Recognition System", Ohmsha, Ltd., 2001, pp. 27-29 (with partial English translation).

* cited by examiner

MODEL LEARNING DEVICE, ESTIMATING DEVICE, METHODS THEREFOR, AND PROGRAM

TECHNICAL FIELD

The present invention relates to a technology for estimating the state of satisfaction of an utterer.

BACKGROUND ART

In the management of a call center, a technology for estimating the state of satisfaction of a customer from a call is needed. Here, the state of satisfaction of a customer is a staged category indicating whether the customer expresses his or her satisfaction or dissatisfaction and refers to, for example, three stages: satisfaction, average, and dissatisfaction. This technology can be applied to, for instance, automatization of evaluations of operators by counting the frequency of satisfaction of customers for each operator or carrying out a survey on the demands of customers by performing speech recognition and text analysis on the utterance indicating satisfaction. As similar technologies of the above-described technology, technologies for estimating satisfaction or dissatisfaction or anger of a customer from a call are proposed in Non-patent Literatures 1 and 2. In Non-patent Literature 1, satisfaction/dissatisfaction of a customer at a given time is estimated by using the feature of the way a customer speaks, such as the rate of utterance, and a linguistic feature such as the presence or absence of a product name of a competitor. In Non-patent Literature 2, the anger/non-anger state of a customer at a given time is estimated by using a prosodic feature such as the pitch or volume of a voice of a customer and a dialogic feature such as the frequency of responses. In either of these technologies, the relationship between each feature amount and satisfaction/dissatisfaction or anger of a customer is learned from a lot of calls by using a machine learning technology and used for estimation.

PRIOR ART LITERATURE

Non-Patent Literature

Non-patent Literature 1: Youngja Park, Stephen C. Gates, "Towards Real-Time Measurement of Customer Satisfaction Using Automatically Generated Call Transcripts," in Proceedings of the 18th ACM conference on Information and knowledge management, pp. 1387-1396, 2009.
Non-patent Literature 2: Narichika Nomoto, Satoshi Kobashikawa, Masafumi Tamoto, Hirokazu Masataki, Osamu Yoshioka, Satoshi Takahashi, "Using nonverbal information and characteristic linguistic representations to detect anger emotion in dialog speech," The transactions of the Institute of Electronics, Information and Communication Engineers, Vol. J96-D, No. 1, pp. 15-24, 2013.

SUMMARY OF THE INVENTION

Problems to be Solved by the Invention

Both of the existing technologies estimate the state of satisfaction of a customer from the features of a call made by a given time or before and after that time. On the other hand, it can be considered that the states of satisfaction of a customer have a time series correlation. However, there exists no literature about a survey on how the state of satisfaction of a customer changes. This can be generalized to, not only a case where the state of satisfaction of a customer in a call is estimated, but also a case where the state of satisfaction of an utterer in a conversation is estimated. An object of the present invention is to estimate the state of satisfaction with consideration given to changes in the state of satisfaction of an utterer.

Means to Solve the Problems

At the time of model learning, a state-of-satisfaction change pattern model including a set of transition weights in a state sequence (a state transition sequence) of the states of satisfaction is obtained for each of predetermined change patterns of the state of satisfaction by using a state-of-satisfaction change pattern correct value indicating a correct value of a change pattern of the state of satisfaction of an utterer in a conversation and state-of-satisfaction correct values, each indicating a correct value of the state of satisfaction of the utterer at the time of each utterance in the conversation, and the state-of-satisfaction change pattern model is output. Moreover, a state-of-satisfaction estimation model for obtaining the posteriori probability of the utterance feature amount given the state of satisfaction of an utterer is obtained by using the utterance-for-learning feature amount and a correct value of the state of satisfaction of an utterer who gave an utterance for learning corresponding to the utterance-for-learning feature amount, and the state-of-satisfaction estimation model is output.

At the time of estimation, by using the input utterance feature amount and the state-of-satisfaction change pattern model and the state-of-satisfaction estimation model, an estimated value of the state of satisfaction of an utterer who gave an utterance corresponding to the input utterance feature amount is obtained and output.

Effects of the Invention

This makes it possible to estimate the state of satisfaction with consideration given to changes in the state of satisfaction of an utterer.

DETAILED DESCRIPTION OF THE EMBODIMENTS

Figure 1:
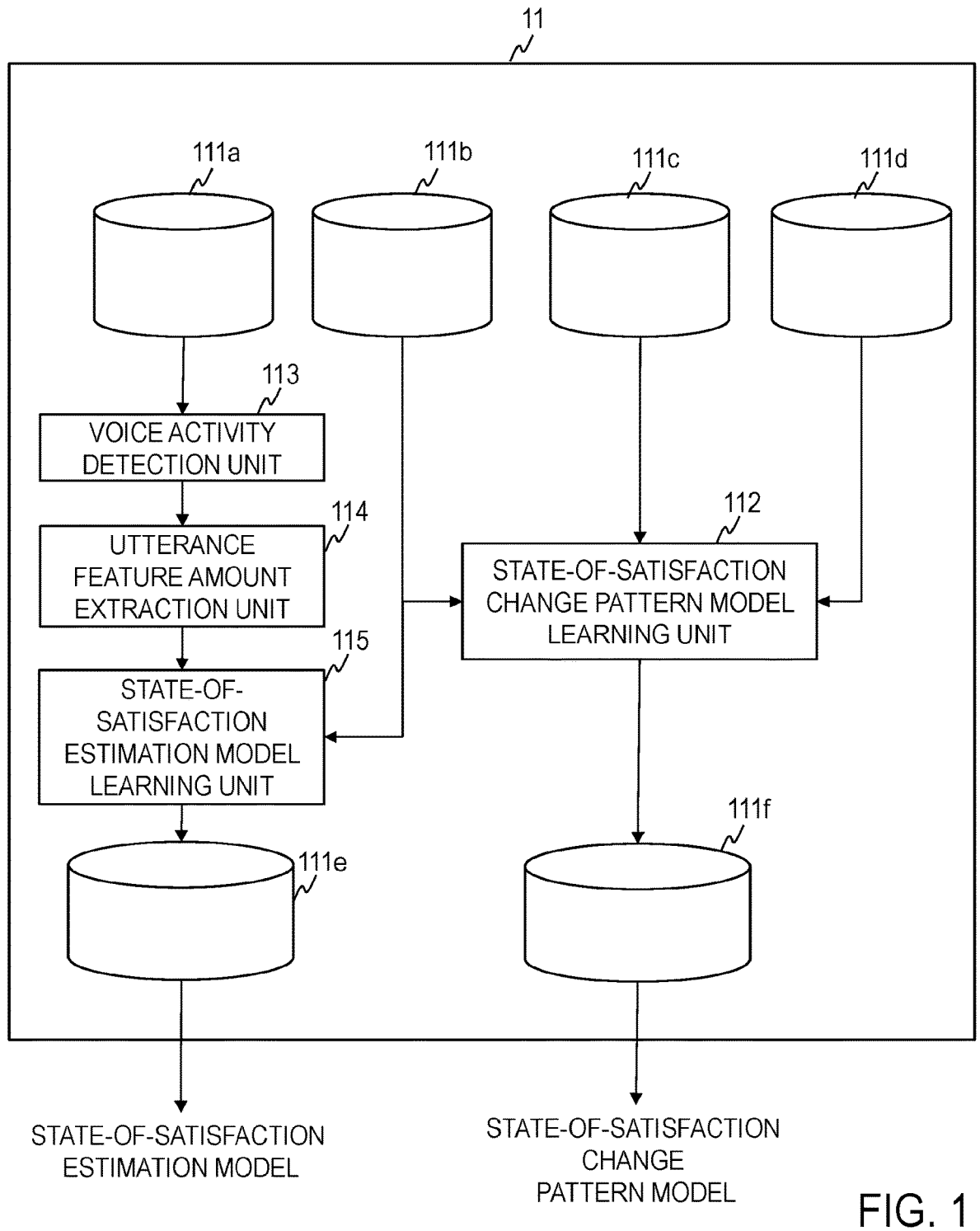
FIG. 1 is a block diagram illustrating the functional configuration of a model learning device of an embodiment.

An embodiment of the present invention will be described.
[General Outline]
The general outline of the present embodiment will be described. In the present embodiment, change patterns of the state of satisfaction of an utterer in a conversation are classified into a predetermined number of expressions, and each change pattern is expressed in a probability model and used for estimation of the state of satisfaction. At the time of model learning, a state-of-satisfaction change pattern model including a set of transition weights in a state sequence (a state transition sequence) of the states of satisfaction is obtained for each of predetermined change patterns of the state of satisfaction by using a state-of-satisfaction change pattern correct value indicating a correct value of a change pattern of the state of satisfaction of an utterer in a conversation and state-of-satisfaction correct values, each indicating a correct value of the state of satisfaction of the utterer at the time of each utterance in the conversation, and a state-of-satisfaction estimation model for obtaining the posteriori probability of the utterance feature amount given the state of satisfaction of an utterer is obtained by using the utterance-for-learning feature amount and a correct value of the state of satisfaction of an utterer who gave an utterance for learning corresponding to the utterance-for-learning feature amount. At the time of estimation of the state of satisfaction, by using the input utterance feature amount and the state-of-satisfaction change pattern model and the state-of-satisfaction estimation model which are obtained by model estimation, an estimated value of the state of satisfaction of an utterer who gave an utterance corresponding to the input utterance feature amount is obtained.

An example of the "conversation" is a call which is made between a customer and a call center; however, the present invention is not limited to this example. The "conversation" may be a call which is made through a telephone line, a call which is made through the Internet, or a call which is made through a local line. The "conversation" may be a conversation such as a dialogue, a talk, or a preliminary meeting which is made by two or more human beings face-to-face, not a call. The "conversation" may be made between human beings or between a human being and an automatic interaction device (such as an interaction device using artificial intelligence). The "utterer" means one particular person who gives an "utterance" in the "conversation". For example, when the "conversation" is a call which is made between a customer and a call center, the customer is the "utterer"; when the "conversation" is a conversation which is made by two or more human beings face-to-face, one particular person taking part in the conversation is the "utterer"; when the "conversation" is a conversation which is made between a human being and an automatic interaction device, the human being who makes a conversation with the automatic interaction device is the "utterer".

The "state of satisfaction" means the degree of satisfaction of the "utterer" (the extent to which the "utterer" is satisfied). The "state of satisfaction" may be what is divided into a plurality of classifications or what is converted into numbers. In the former case, the "state of satisfaction" may be what is divided into two classifications (for example, two classifications: satisfaction and dissatisfaction), what is divided into three classifications (for example, three classifications: satisfaction, average, and dissatisfaction), or what is divided into four or more classifications.

Figure 3:
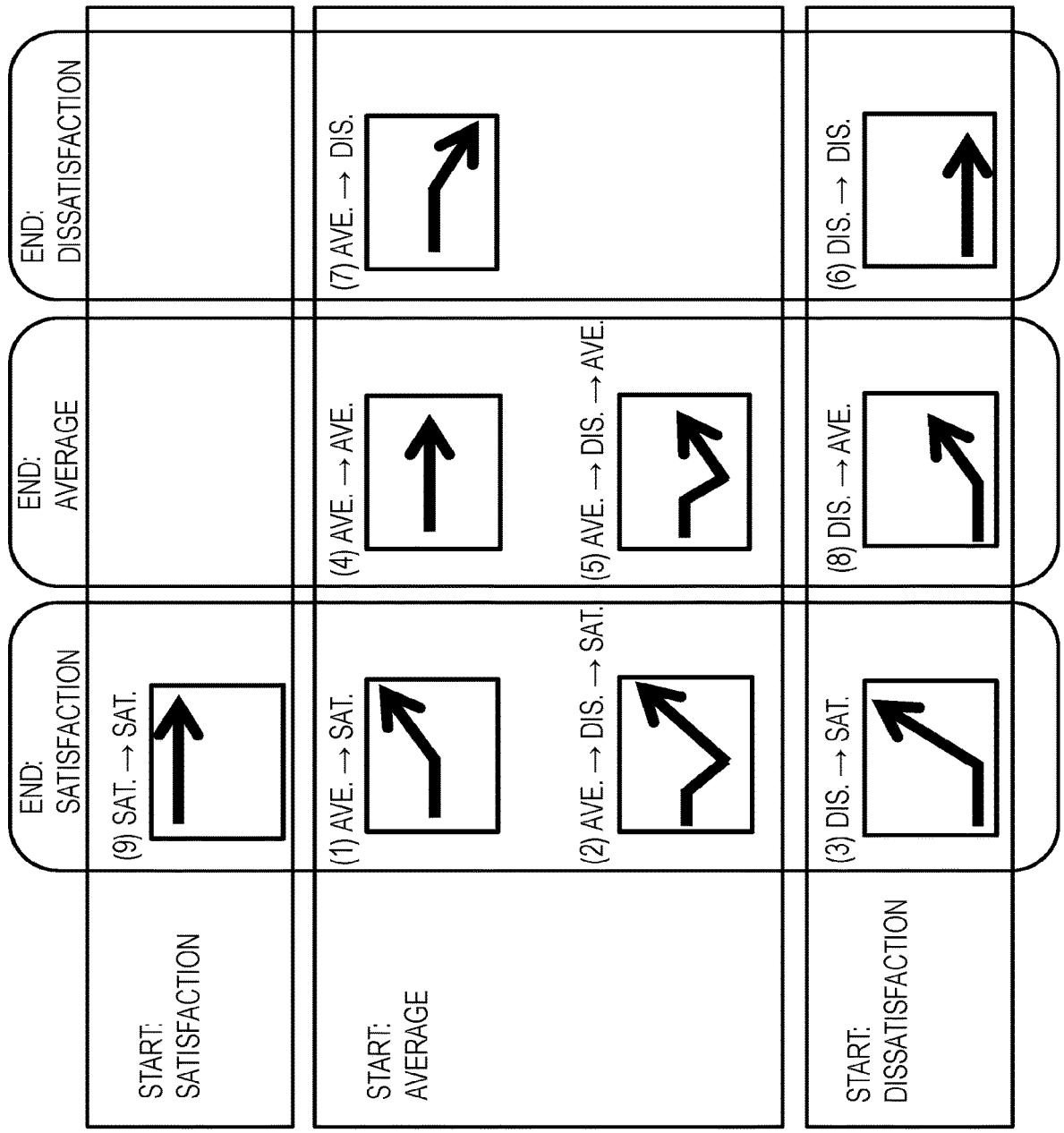
FIG. 3 illustrates change patterns of the state of satisfaction.

The "change pattern" is a pattern indicating how the "state of satisfaction" of the "utterer" in the "conversation" changes. In other words, the "change pattern" is a pattern indicating temporal changes in the "state of satisfaction" at a plurality of time points in the "conversation". The types and number of the "change patterns" are determined in advance. By using the "change pattern", it is possible to estimate, from the estimated transition of the "state of satisfaction", to which of the "change patterns" the "state of satisfaction" of the "utterer" applies and to which "state of satisfaction" the "state of satisfaction" probably transitions next. There is no restriction on the types and numbers of the "change patterns". The inventor has listened and analyzed a lot of calls on the assumption that the "state of satisfaction" is any one of the states: "satisfaction", "average", and "dissatisfaction" and found that the "change patterns" of the "state of satisfaction" of a customer (an utterer) in a call-center call can be classified into the following nine patterns (FIG. 3).

(1) Average→satisfaction: A pattern in which average changes to satisfaction
(2) Average→dissatisfaction→satisfaction: A pattern in which average changes to dissatisfaction and then changes to satisfaction
(3) Dissatisfaction→satisfaction: A pattern in which dissatisfaction changes to satisfaction
(4) Average→average: A pattern in which average continues
(5) Average→dissatisfaction→average: A pattern in which average changes to dissatisfaction and then changes to average
(6) Dissatisfaction→dissatisfaction: A pattern in which dissatisfaction continues
(7) Average→dissatisfaction: A pattern in which average changes to dissatisfaction
(8) Dissatisfaction→average: A pattern in which dissatisfaction changes to average
(9) Satisfaction→satisfaction: A pattern in which satisfaction continues That is, when the "state of satisfaction" is any one of the states: "satisfaction", "average", and "dissatisfaction", it is desirable that the "change pattern" is any one of the above-described patterns (1) to (9). It is to be noted that the state of satisfaction at the start of the "conversation" of (9) is "satisfaction", the state of satisfaction at the start of the "conversation" of (1), (2), (4), (5), and (7) is "average", and the state of satisfaction at the start of the "conversation" of (3), (6), and (8) is "dissatisfaction". The state of satisfaction at the end of the "conversation" of (1), (2), (3), and (9) is "satisfaction", the state of satisfaction at the end of the "conversation" of (4), (5), and (8) is "average", and the state of satisfaction at the end of the "conversation" of (6) and (7) is "dissatisfaction". As described above, when the state of satisfaction at the start of the "conversation" shows a high level of satisfaction (is "satisfaction" or "average"), the state of satisfaction at the end of the "conversation" also tends to show a high level of satisfaction. The number of cases where the state of satisfaction at the end of the "conversation" shows a higher level of satisfaction than the level at the start of the "conversation" is smaller than the number of other cases. It is assumed that the state of satisfaction "satisfaction" shows the highest level of satisfaction, the state of satisfaction "average" shows the second highest level of satisfaction, and the state of satisfaction "dissatisfaction" shows the lowest level of satisfaction.

Figure 4:
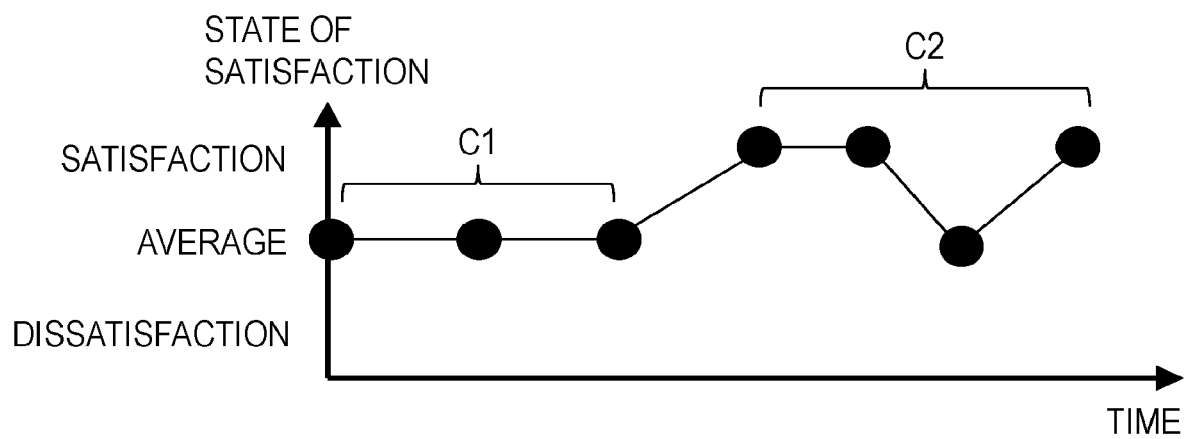
FIG. 4 is a diagram illustrating temporal changes in the state of satisfaction.
Figure 5:
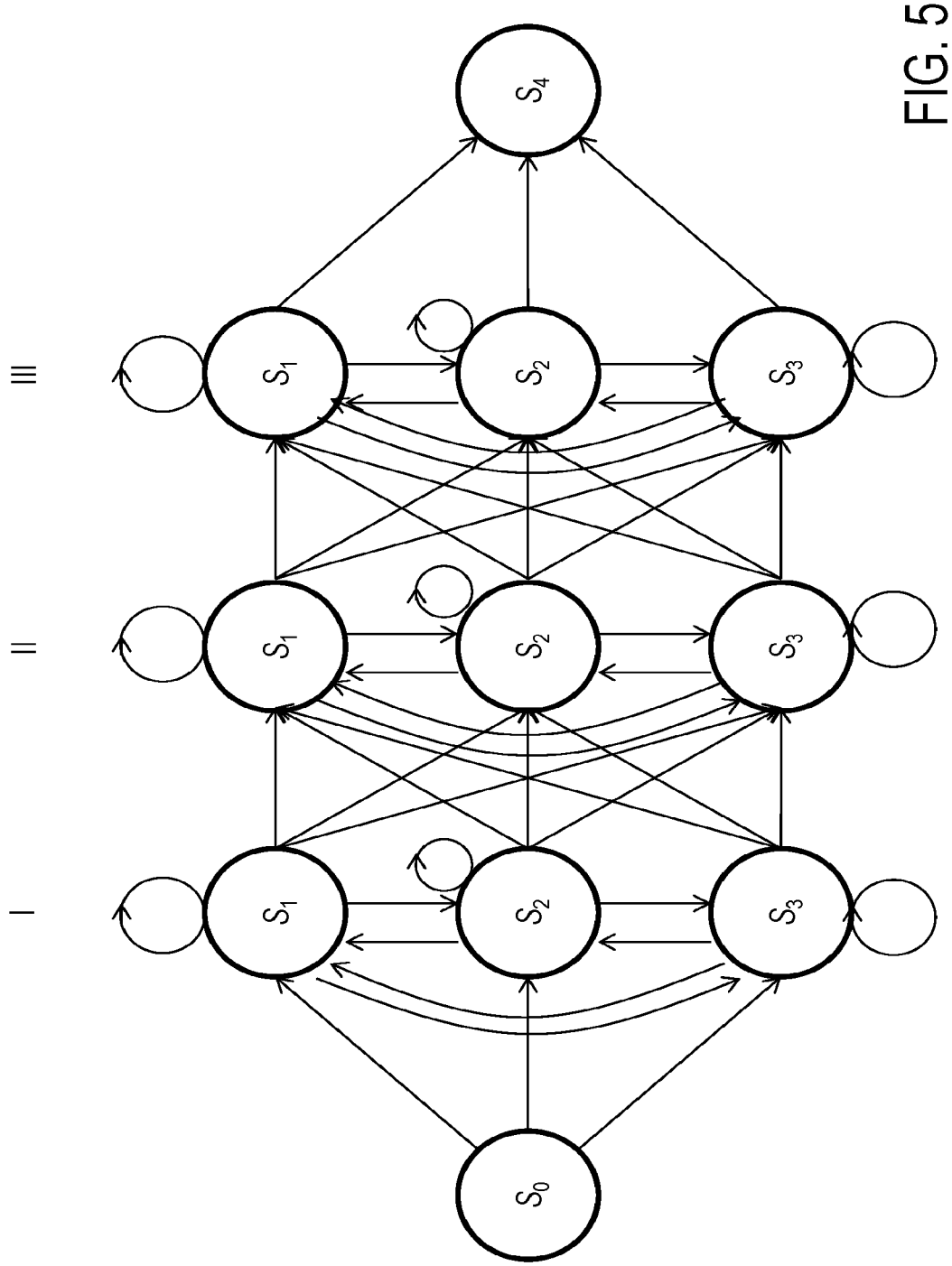
FIG. 5 is a diagram illustrating a state-of-satisfaction change pattern model structure.

Here, the "state of satisfaction" of the "utterer" in the "conversation" changes in various ways. As illustrated in FIG. 4, the same state of satisfaction sometimes continues at a plurality of time points (C1) and the state of satisfaction sometimes changes at a plurality of time points (C2). For this reason, changes in the state of satisfaction of the "utterer" in an actual "conversation" do not always fit into a predetermined "change pattern". To express such complicated changes, for each "change pattern", changes in the state of satisfaction are expressed in a probability model (a state-of-satisfaction change pattern model). That is, for each "change pattern", a "state-of-satisfaction change pattern model" including a set of transition weights (for example, transition probabilities) in a state sequence of the "states of satisfaction" is generated. In other words, a model including a set of transition weights between the "states of satisfaction" in a state sequence is a "state-of-satisfaction change pattern model". It is to be noted that a state sequence of the "states of satisfaction" means a sequence of the "states of satisfaction" to which the state of satisfaction can transition from the start to the end of the "conversation". For modeling of the "change pattern", hidden Markov model (HMM) is used, for example (Reference Literature 1: Keiichi Tokuda, "State-of-the-art Technology of Speech Information Processing: Speech Recognition and Speech Synthesis based on Hidden Markov Models", IPSJ Magazine, Vol. 45, No. 10, pp. 1005-1011, 2004). In order to properly model various changes in the state of satisfaction, it is desirable that left-to-right HMM with branches, not a chain-like HMM, is used for modeling of the "change pattern". In FIG. 5, a state sequence of the "states of satisfaction" in left-to-right HMM with branches is illustrated. In this example, from the "state of satisfaction" $S_0$ at the start of the "conversation", the state of satisfaction transitions to each of the "states of satisfaction" at time points I, II, and III and reaches the "state of satisfaction" $S_4$ at the end of the "conversation". The "states of satisfaction" at time points I, II, and III each branch to three states: $S_1$=satisfaction, $S_2$=average, and $S_3$=dissatisfaction. A state sequence of the "states of satisfaction" which is used for modeling of the "change pattern" is referred to as a "state-of-satisfaction change pattern model structure". Although the "state-of-satisfaction change pattern model" is obtained for each "change pattern", it is desirable that the same "state-of-satisfaction change pattern model structure" is used for all the "change patterns". That is, it is desirable to use the same "state-of-satisfaction change pattern model structure" for all the "change patterns" and obtain the "state-of-satisfaction change pattern model" for each of the "change patterns". The reason is as follows. If the "state-of-satisfaction change pattern model structure" is changed in accordance with the "change pattern", the "state-of-satisfaction change pattern model" reflects the tendency of the "state-of-satisfaction change pattern model structure", which sometimes makes it impossible to model the "change pattern" properly. However, the same "state-of-satisfaction change pattern model structure" may not be used for all the "change patterns" as long as the "change pattern" can be properly modeled.

Details of the Embodiment

Hereinafter, the present embodiment will be specifically described with reference to the drawings.

<Configuration>

Figure 2:
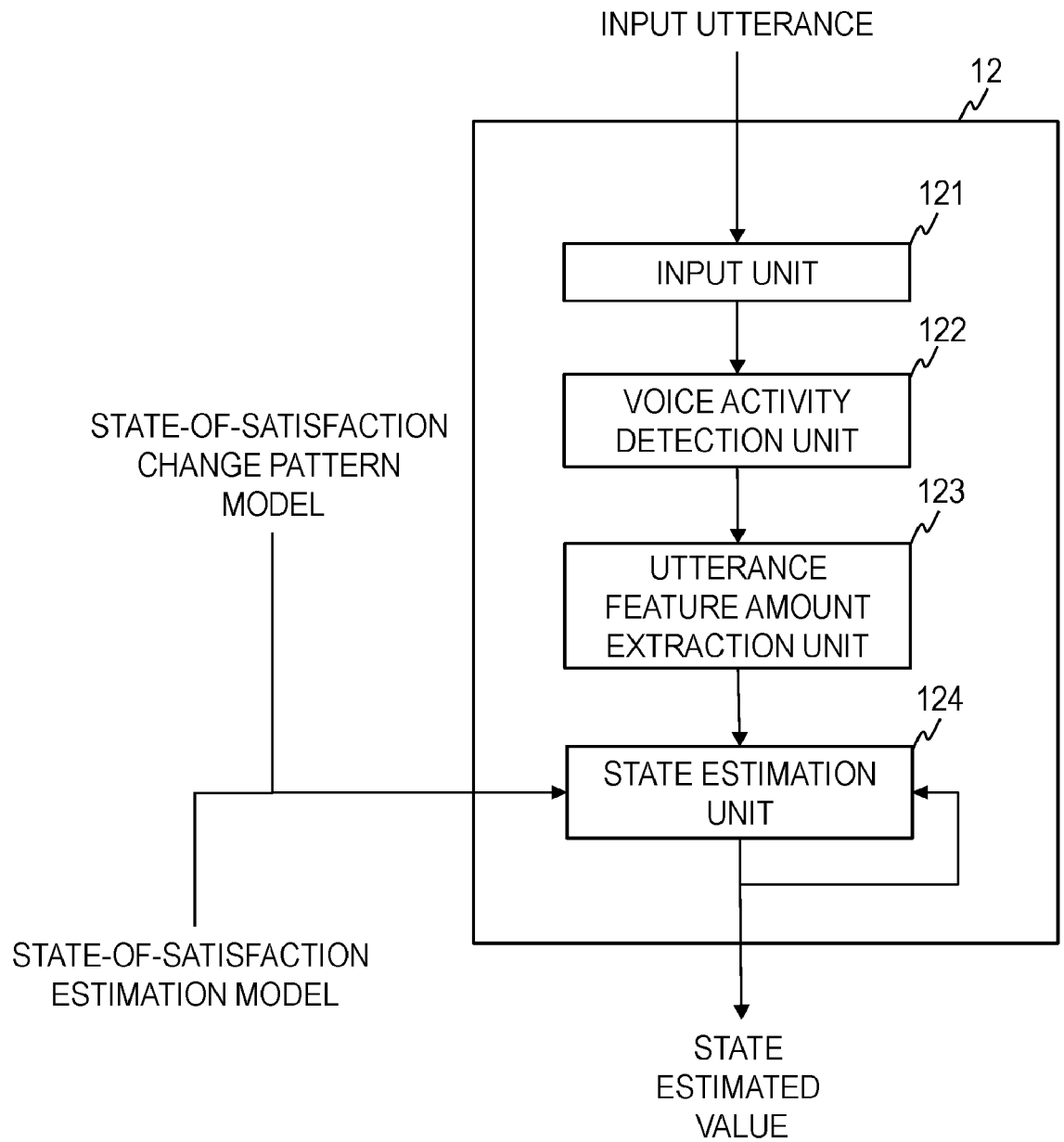
FIG. 2 is a block diagram illustrating the functional configuration of an estimating device of the embodiment.

As illustrated in FIG. 1, a model learning device 11 of the present embodiment includes an utterance-for-learning storage 111a, a state-of-satisfaction correct value storage 111b, a state-of-satisfaction change pattern correct value storage 111c, a state-of-satisfaction change pattern model structure storage 111d, a state-of-satisfaction estimation model storage 111e, a state-of-satisfaction change pattern model storage 111f, a state-of-satisfaction change pattern model learning unit 112, a voice activity detection unit 113, an utterance feature amount extraction unit 114, and a state-of-satisfaction estimation model learning unit 115. As illustrated in FIG. 2, an estimating device 12 of the present embodiment includes an input unit 121, a voice activity detection unit 122, an utterance feature amount extraction unit 123, and a state estimation unit 124. Each of the model learning device 11 and the estimating device 12 of the present embodiment is configured as a result of, for example, a general-purpose or dedicated computer including a processor (a hardware processor) such as a central processing unit (CPU), memory such as random-access memory (RAM) and read-only memory (ROM), and so forth executing a predetermined program. This computer may include one processor or memory or more than one processor or memory. This program may be installed in the computer or may be recorded on the ROM or the like in advance. Moreover, part or all of the processing units may be configured by using not an electronic circuit (circuitry), like a CPU, which implements a functional configuration as a result of a program being read thereinto but an electronic circuit that implements a processing function without using a program. An electronic circuit with which one device is configured may include a plurality of CPUs.

<Model Learning Processing>

First, model learning processing which is performed by the model learning device 11 (FIG. 1) will be described.

<<Preprocessing>>

As preprocessing, an "utterance for learning" necessary for model learning is stored in the utterance-for-learning storage 111a of the model learning device 11 (FIG. 1), a "state-of-satisfaction change pattern correct value" is stored in the state-of-satisfaction change pattern correct value storage 111c, "state-of-satisfaction correct values" are stored in the state-of-satisfaction correct value storage 111b, and a "state-of-satisfaction change pattern model structure" is stored in the state-of-satisfaction change pattern model structure storage 111d. The "utterance for learning" is time series speech data of "utterances" given by an "utterer" in each of a plurality of "conversations". The "utterance for learning" is obtained by recording the contents of "utterances" of an "utterer" who is making a "conversation". The "state-of-satisfaction change pattern correct value" indicates a correct value of a "change pattern" of the state of satisfaction of an "utterer" in each of the "conversations". The "state-of-satisfaction change pattern correct value" is manually set based on answers made by an "utterer" about a "change pattern" to which changes in his or her state of satisfaction in the "conversation" apply. The "state of satisfaction" of the present embodiment is any one of the three states: "satisfaction", "average", and "dissatisfaction", and the "state-of-satisfaction change pattern correct value" is any one of the above-mentioned nine "change patterns" (1) to (9) (FIG. 3). Each of the "state-of-satisfaction correct values" indicates a correct value of the "state of satisfaction" of an "utterer" at the time of each utterance in these "conversations". That is, the "state-of-satisfaction correct value" indicates a correct value of the "state of satisfaction" of an "utterer" at a time point at which each utterance was given by the "utterer". The "state-of-satisfaction correct values" are manually set based on answers made by an "utterer" about the "state of satisfaction" at time points at which the "utterer" gave "utterances". The "state-of-satisfaction change pattern model structure" is a state sequence of the "states of satisfaction" which is used for modeling of the "change pattern". An example of the "state-of-satisfaction change pattern model structure" is the state sequence illustrated in FIG. 5. In the present embodiment, the same "state-of-satisfaction change pattern model structure" is used for all the "change patterns". However, the present invention is not limited thereto. A label for identifying a "conversation" and an "utterance" corresponding to each time point is correlated with the "utterance for learning", a label for identifying a "conversation" corresponding to each "state-of-satisfaction change pattern correct value" is correlated with the "state-of-satisfaction change pattern correct value", and a label for identifying an "utterance" corresponding to each "state-of-satisfaction correct value" is correlated with the "state-of-satisfaction correct value". As a result, the "utterance for learning", the "state-of-satisfaction change pattern correct value", and the "state-of-satisfaction correct value" are correlated with each other.

<<Processing which is Performed by the State-of-Satisfaction Change Pattern Model Learning Unit 112>>

Figure 6:
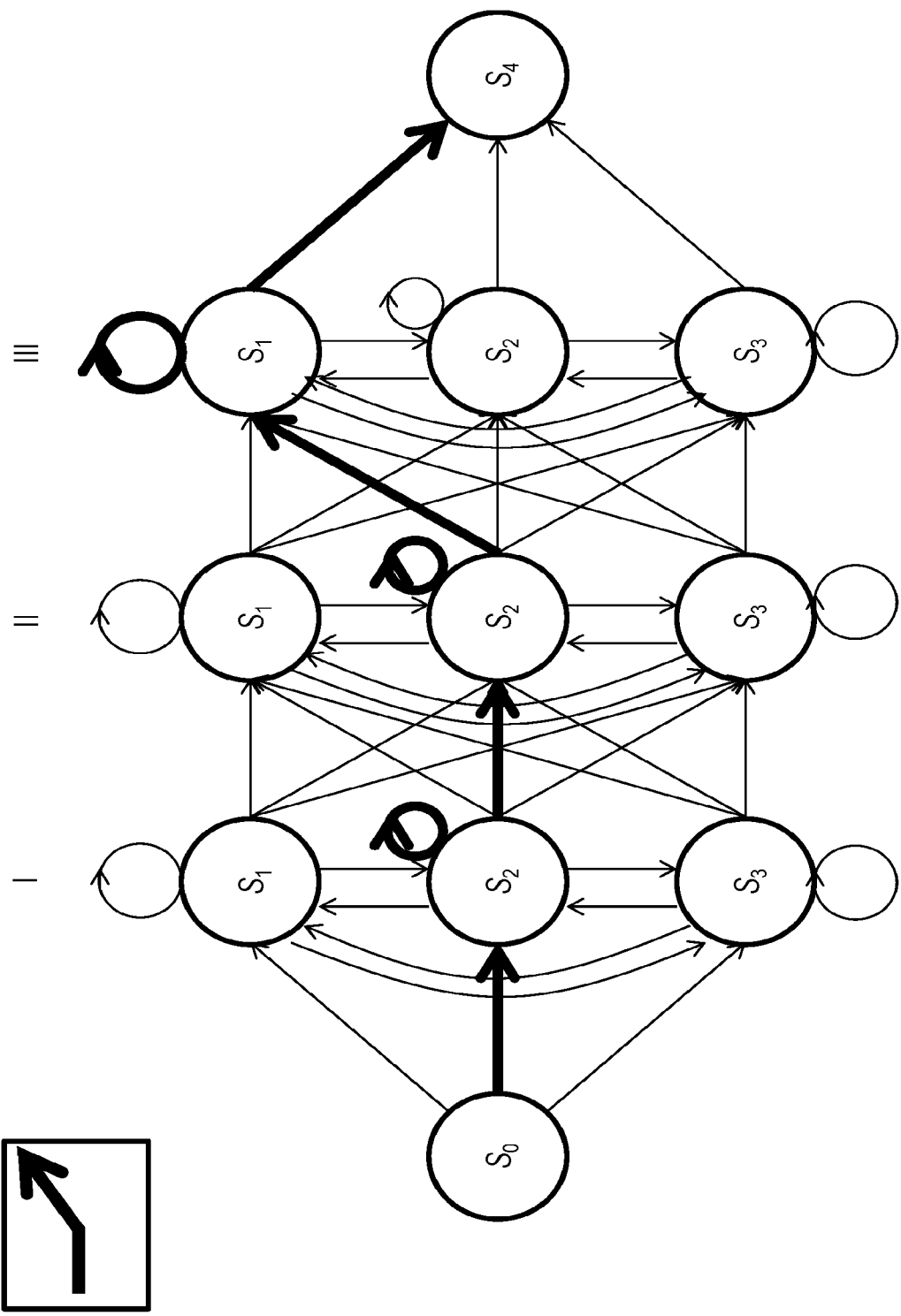
FIG. 6 is a diagram illustrating a state-of-satisfaction change pattern model structure.

To the state-of-satisfaction change pattern model learning unit 112, the "state-of-satisfaction change pattern correct value", the "state-of-satisfaction correct values", and the "state-of-satisfaction change pattern model structure", which are respectively read from the state-of-satisfaction change pattern correct value storage 111c, the state-of-satisfaction correct value storage 111b, and the state-of-satisfaction change pattern model structure storage 111d, are input. By using them, the state-of-satisfaction change pattern model learning unit 112 obtains, for each of the predetermined "change patterns" of the "state of satisfaction", a "state-of-satisfaction change pattern model" including the "state-of-satisfaction change pattern model structure" and a set of transition weights of the states of satisfaction and outputs the "state-of-satisfaction change pattern model". When K types (where K is the total number of change patterns (K≥2) and K=9 in the example of FIG. 3) of change patterns $C_1, \ldots, C_K$ are set, the state-of-satisfaction change pattern model learning unit 112 obtains, for each change pattern $C_k$ (where k=1, . . . , K), a state-of-satisfaction change pattern model $PM_k$ (where k=1, . . . , K) and outputs the state-of-satisfaction change pattern model $PM_k$. For the generation of the state-of-satisfaction change pattern model $PM_k$, "state-of-satisfaction correct values" corresponding to "utterances" given in a "conversation" whose "state-of-satisfaction change pattern correct value" is the change pattern $C_k$ are used. In other words, the state-of-satisfaction change pattern model learning unit 112 learns transition weights (for example, transition probabilities) between the states of satisfaction included in the "state-of-satisfaction change pattern model structure" by using, as learning data, "state-of-satisfaction correct values" corresponding to "utterances" included in a "conversation" whose "state-of-satisfaction change pattern correct value" is the change pattern $C_k$, and outputs the state-of-satisfaction change pattern model $PM_k$ including the "state-of-satisfaction change pattern model structure" and a set of the obtained transition weights. In the case of the "state-of-satisfaction change pattern model structure" illustrated in FIG. 5, by using, as learning data, "state-of-satisfaction correct values" corresponding to "utterances" included in a "conversation" whose "state-of-satisfaction change pattern correct value" is the change pattern $C_k$, the state-of-satisfaction change pattern model learning unit 112 learns transition weights from $S_0$ to $S_1$, $S_2$, and $S_3$ in Stage I, transition weights of $S_1$, $S_2$, and $S_3$ in Stage I, transition weights from $S_1$, $S_2$, and $S_3$ in Stage I to $S_1$, $S_2$, and $S_3$ in Stage II, transition weights of $S_1$, $S_2$, and $S_3$ in Stage II, transition weights from $S_1$, $S_2$, and $S_3$ in Stage II to $S_1$, $S_2$, and $S_3$ in Stage III, transition weights of $S_1$, $S_2$, and $S_3$ in Stage III, and transition weights from $S_1$, $S_2$, and $S_3$ in Stage III to $S_4$, and outputs the state-of-satisfaction change pattern model $PM_k$ including the "state-of-satisfaction change pattern model structure" illustrated in FIG. 5 and a set of the obtained transition weights. It is to be noted that, when the "state-of-satisfaction change pattern model structure" is known, information which does not include the "state-of-satisfaction change pattern model structure" and includes a set of the obtained transition weights may be used as the "state-of-satisfaction change pattern model". In FIG. 6, a state transition with heavy transition weights of the transition weights corresponding to the change pattern which is the above-described "(1) Average→satisfaction: A pattern in which average changes to satisfaction" is illustrated by thick arrows, and a state transition with light transition weights of the transition weights is illustrated by thin arrows. Learning of transition weights can be performed by the same procedure as that of HMM learning which is performed when a state sequence is known (see, for example, Reference Literature 2 (Kiyohiro Shikano, Katsunobu Ito, Tatsuya Kawahara, Kazuya Takeda, Mikio Yamamoto, "Speech Recognition System", Ohmsha, Ltd., pp. 27-29, 2001)). The state-of-satisfaction change pattern model $PM_k$ is obtained for each change pattern $C_k$ (where k=1, K). The state-of-satisfaction change pattern model learning unit 112 obtains, by using the same "state-of-satisfaction change pattern model structure" for all the change patterns $C_1, \ldots, C_K$, the state-of-satisfaction change pattern model $PM_k$ (where k=1, . . . , K) for each change pattern $C_k$ (where k=1, . . . , K), and outputs the state-of-satisfaction change pattern model $PM_k$. The state-of-satisfaction change pattern model $PM_k$ (where k=1, . . . , K) obtained for each change pattern $C_k$ (where k=1, . . . , K) is stored in the state-of-satisfaction change pattern model storage 111f.

<<Processing which is Performed by the Voice Activity Detection Unit 113>>

To the voice activity detection unit 113, the "utterance for learning" read from the utterance-for-learning storage 111a is input. The voice activity detection unit 113 detects one or more voice activities by applying voice activity detection to the input "utterance for learning", and extracts an "utterance" of the "utterer" in the detected voice activities and outputs the "utterance". For voice activity detection, a well-known voice activity detection technique such as a technique based on threshold processing of power or a technique based on the likelihood ratio of speech/non-speech models can be used.

<<Processing which is Performed by the Utterance Feature Amount Extraction Unit 114>>

To the utterance feature amount extraction unit 114, the "utterance (the utterance for learning)" of the "utterer" in the voice activity, which is output from the voice activity detection unit 113, is input. The utterance feature amount extraction unit 114 extracts the "utterance-for-learning feature amount", which is the feature amount considered to be related to the "state of satisfaction", for each "utterance" of the "utterer". For instance, the utterance feature amount extraction unit 114 extracts, as the "utterance-for-learning feature amount", the feature amount including at least one or more of the prosodic feature, the dialogic feature, and the language feature of an "utterance". As the prosodic feature, at least one or more of, for example, the fundamental frequency of an utterance, the mean, standard deviation, maximum value, and minimum value of power, the rate of utterance during the utterance, and the duration of a final phoneme in the utterance can be used. When the fundamental frequency or power of an utterance is used as at least part of the feature amount, the utterance feature amount extraction unit 114 may divide an utterance into frames, obtain the fundamental frequency or power for each frame, and use the fundamental frequency or power of each frame as at least part of the feature amount. When the rate of utterance or the duration of a final phoneme is used as at least part of the feature amount, the utterance feature amount extraction unit 114 may estimate a phoneme sequence in an utterance by using a well-known speech recognition technology and obtain the rate of utterance or the duration of a final phoneme. As the dialogic feature, at least one or more of the following can be used: the time from the previous "utterance" given by an "utterer" such as a customer to the present "utterance"; the time from a dialogic utterance given by a dialogist, such as an operator, who made a conversation with an "utterer" such as a customer to an "utterance" given by the "utterer" such as the customer; the time from an "utterer" such as a customer to the next dialogic utterance given by a dialogist such as an operator; the length of an "utterance" given by an "utterer" such as a customer; the length of a dialogic utterance given by a dialogist such as an operator, which was given before and after an "utterance" given by an "utterer"; the number of responses made by an "utterer" such as a customer during a dialogic utterance given by a dialogist such as an operator before and after it; and the number of responses made by a dialogist such as an operator during an utterance given by an "utterer" such as a customer. As the language feature, at least one or more of the number of words in an utterance, the number of fillers in the utterance, and the number of words of appreciation in the utterance can be used. When the language feature is used as at least part of the feature amount, the utterance feature amount extraction unit 114 may estimate a word which may be used in an utterance by using a well-known speech recognition technology and use the result thereof. The number of words of appreciation (for example, "thank you" or "thanks"), which are manually selected, may be used as at least part of the feature amount. Which of the features is used as the "utterance-for-learning feature amount" is determined in advance. The utterance feature amount extraction unit 114 outputs the extracted "utterance-for-learning feature amount".

<<Processing which is Performed by the State-of-Satisfaction Estimation Model Learning Unit 115>>

To the state-of-satisfaction estimation model learning unit 115, the "utterance-for-learning feature amount" output from the utterance feature amount extraction unit 114 and the correct value of the "state of satisfaction" read from the state-of-satisfaction correct value storage 111b are input. It is to be noted that the correct value of the "state of satisfaction" input to the state-of-satisfaction estimation model learning unit 115 is the correct value of the "state of satisfaction" of an "utterer" who gave an "utterance" corresponding to the "utterance-for-learning feature amount" which is input to the state-of-satisfaction estimation model learning unit 115. That is, the "utterance-for-learning feature amount" and the correct value of the "state of satisfaction" of an "utterer" at the time of each "utterance" corresponding to the "utterance-for-learning feature amount" are input to the state-of-satisfaction estimation model learning unit 115. The state-of-satisfaction estimation model learning unit 115 performs learning processing by using a pair of the input "utterance-for-learning feature amount" and the correct value of the "state of satisfaction" of an "utterer" for each "utterance (utterance for learning)" corresponding to the "utterance-for-learning feature amount", generates a "state-of-satisfaction estimation model" for obtaining the posteriori probability (the posteriori probability of an estimated value of the utterance feature amount) of the "utterance feature amount (the utterance feature amount of each utterance of the utterer)" given the "state of satisfaction of the utterer (the state of satisfaction when the utterer gave each utterance)", and outputs the "state-of-satisfaction estimation model". For example, as the "state-of-satisfaction estimation model", a neural network or the like can be used, and, for model learning therefor, error backpropagation which is the existing neural network learning technique, for example, can be used. Models other than the neural network may be used as long as the posteriori probability of the "utterance feature amount" given the "state of satisfaction" of an "utterer" can be obtained, and a normal mixture distribution model, for instance, may be used. If the "state of satisfaction" of an "utterer" at the time of an n-th "utterance" by the "utterer" in a "conversation" is assumed to be S(n) and the "utterance feature amount" of the n-th "utterance" is assumed to be X(n), the posteriori probability of the utterance feature amount X(n) given the state of satisfaction S(n) of the utterer can be expressed as P(X(n)|S(n)). It is assumed that, in the posteriori probability P(X(n)|S(n)), the state of satisfaction S(n) does not depend on n. The state-of-satisfaction estimation model learning unit 115 outputs the generated "state-of-satisfaction estimation model", and the "state-of-satisfaction estimation model" is stored in the state-of-satisfaction estimation model storage 111e.

<Estimation Processing>

Next, estimation processing which is performed by the estimating device 12 (FIG. 2) will be described.

<<Input to the Input Unit 121>>

An "input utterance", which is an utterance based on which the state of satisfaction is to be estimated, is input to the input unit 121 of the estimating device 12. The "input utterance" is time series data of the utterances given by an "utterer" in a "conversation". The "input utterance" is output to the voice activity detection unit 122.

<<Processing which is Performed by the Voice Activity Detection Unit 122>>

To the voice activity detection unit 122, the "input utterance" output from the input unit 121 is input. The voice activity detection unit 122 detects one or more voice activities by applying voice activity detection to the input "input utterance", extracts an "input utterance" of the "utterer" in the detected voice activities, and outputs the "input utterance". For voice activity detection, a well-known voice activity detection technique such as a technique based on threshold processing of power or a technique based on the likelihood ratio of speech/non-speech models can be used.

<<Processing which is Performed by the Utterance Feature Amount Extraction Unit 123>>

To the utterance feature amount extraction unit 123, the "input utterance" of the "utterer" in the voice activity, which is output from the voice activity detection unit 122, is input. The utterance feature amount extraction unit 123 extracts, for each "input utterance" of the "utterer", the "input utterance feature amount" which is the feature amount considered to be related to the "state of satisfaction". The type of the feature amount which is extracted by the utterance feature amount extraction unit 123 is the same as the type of the feature amount which is extracted by the above-mentioned utterance feature amount extraction unit 114. The utterance feature amount extraction unit 123 outputs the extracted "input utterance feature amount".

<<Processing which is Performed by the State Estimation Unit 124>>

To the state estimation unit 124, the "input utterance feature amount" output from the utterance feature amount extraction unit 123, the "state-of-satisfaction estimation model" read from the state-of-satisfaction estimation model storage 111e of the model learning device 11 (FIG. 1), and the "state-of-satisfaction change pattern model" read from the state-of-satisfaction change pattern model storage 111f are input. The state estimation unit 124 obtains an estimated value of the state of satisfaction of the "utterer" who gave the "utterance" corresponding to the "input utterance feature amount" by using the "input utterance feature amount", the "state-of-satisfaction estimation model", and the "state-of-satisfaction change pattern model" and outputs the estimated value. Based on the following formula, the state estimation unit 124 of the present embodiment obtains an estimated value of the state of satisfaction of the "utterer" at the time of the "utterance".

$$\hat{S}(n) = \underset{S(n)}{\mathrm{argmax}} P(S(n)|X(n))P(S(n)|\hat{S}(n-1), \ldots, \hat{S}(1), C_k) \quad (1)$$

It is to be noted that Sˆ(n) represents an estimated value of the "state of satisfaction" of the "utterer" at the time of an n-th (n-th in chronological order; n is an integer greater than or equal to 2) "utterance" in the "conversation", S(n) represents the "state of satisfaction" of the "utterer" at the time of the n-th "utterance" in the "conversation", X(n) represents the "input utterance feature amount" of the n-th "utterance" in the "conversation", and $C_k$ (where k=1, K) represents a k-th change pattern of the above-mentioned K (for example, nine) change patterns. "ˆ" in "Sˆ(n)" is supposed to be written immediately above "S", but, due to a restriction imposed by text notation, it is written above "S" on the right side thereof. Moreover, an initial value Sˆ(1) of Sˆ(n) may be a constant, or any estimated Sˆ(n) from the first to the last conversation may be used as the initial value Sˆ(1) this time. Furthermore, P(a) represents the probability of an event α and $$\underset{S(n)}{\mathrm{argmax}} P(\alpha)$$

means S(n) which maximizes P(a). Moreover, Formula (1) is derived as follows.

$$\begin{aligned}
\hat{S}(n) &= \underset{S(n)}{\arg\max} P(X(n), S(n) \mid \hat{S}(n-1), \ldots, \hat{S}(1), C_k) \\
&= \underset{S(n)}{\arg\max} P(X(n), S(n) \mid \hat{S}(n-1), \ldots, \hat{S}(1), C_k) \times \\
&\quad P(S(n) \mid \hat{S}(n-1), \ldots, \hat{S}(1), C_k) \\
&= \underset{S(n)}{\arg\max} P(X(n)|S(n))P(S(n)|\hat{S}(n-1), \ldots, \hat{S}(1), C_k) \\
&= \underset{S(n)}{\arg\max} P(S(n)|X(n))P(S(n)|\hat{S}(n-1), \ldots, \hat{S}(1), C_k)
\end{aligned}$$

More specifically, the state estimation unit 124 obtains P(X(n)|S(n)) by applying the input utterance feature amount X(n) to the "state-of-satisfaction estimation model" and further obtains, for each change pattern $C_k$ (where k=1, . . . , K), P(S(n)|Sˆ(n−1), Sˆ(1), $C_k$) by using the "state-of-satisfaction change pattern model" and Sˆ(n−1), Sˆ(1). The state estimation unit 124 obtains, for each change pattern $C_k$ (where k=1, K; for example, K=1, . . . , 9), S(n), which maximizes the product P(X(n)|S(n))P(S(n)|Sˆ(n−1), Sˆ(1) $C_k$), as Sˆ(n). Furthermore, the state estimation unit 124 selects the change pattern $C_k$ with the greatest P(X(n) |S(n))P(S(n)|Sˆ(n−1), Sˆ(1), $C_k$) corresponding to Sˆ(n)=S (n) obtained for each change pattern $C_k$ (where k=1, K; for example, K=1, . . . , 9), and outputs Sˆ(n) corresponding to the selected change pattern $C_k$ as an estimated value of the state of satisfaction of the "utterer" at the time of the n-th "utterance" in the "conversation". If they are calculated in a brute-force manner, calculation amount is significantly increased; therefore, as in the case where, for example, HMM is used in speech recognition, only a maximum likelihood sequence may be used for calculation by using the Viterbi algorithm. The obtained Sˆ(n) is recursively used for calculation of the next n+1-th Sˆ(n+1).

Features of the Present Embodiment

It can be considered that the states of satisfaction of an "utterer" in a "conversation" have a time series correlation. For example, there is an extremely low possibility that the state of satisfaction of an "utterer" whose state of satisfaction at a given time in a "conversation" is "satisfaction" changes to "dissatisfaction" at the next time. Moreover, since an "utterer" whose state of satisfaction transitions from "dissatisfaction" to "average" and then to "satisfaction" has a strong feeling of satisfaction to the extent that "dissatisfaction" has changed to "satisfaction", it can be expected that "satisfaction" will continue to some extent. As described above, the state of satisfaction of an "utterer" has a strong correlation to the state of satisfaction up to a given "utterance". In the present embodiment, a "state-of-satisfaction change pattern model" and a "state-of-satisfaction estimation model" are learned and, by using them and the "input utterance feature amount", an estimated value of the state of satisfaction of an utterer who gave an utterance corresponding to the "input utterance feature amount" is obtained. By doing so, it is possible to estimate the state of satisfaction with consideration given to changes in the state of satisfaction of an "utterer".

[Other Modifications Etc.]

It is to be noted that the present invention is not limited to the above-described embodiment. For instance, the model learning device 11 and the estimating device 12 may be one and the same device, the model learning device 11 may be configured with a plurality of devices, or the estimating device 12 may be configured with a plurality of devices.

In the above-described embodiment, the state estimation unit 124 selects the change pattern $C_k$ with the greatest P(X(n)|S(n))P(S(n)|Sˆ(n−1), . . . , SAW, $C_k$) corresponding to Sˆ(n)=S(n) obtained for each change pattern $C_k$ (where k=1, K; for example, K=1, . . . , 9) and outputs Sˆ(n) corresponding to the selected change pattern $C_k$ as an estimated value of the state of satisfaction of the "utterer" at the time of the n-th "utterance" in the "conversation". Alternatively, a plurality of change patterns $C_k$ may be selected in the order of P(X(n)|S(n))P(S(n)|Sˆ(n−1), . . . , Sˆ(1), $C_k$) corresponding to Sˆ(n)=S(n) obtained for each change pattern $C_k$ (where k=1, . . . , K; for example, K=1, . . . , 9) from greatest to smallest, and Sˆ(n) corresponding to the selected change patterns $C_k$ may be used as estimated values of the state of satisfaction of the "utterer" at the time of the n-th "utterance" in the "conversation". Moreover, the state estimation unit 124 may output, as an estimated value of the state of satisfaction of an "utterer", Sˆ(n)=S(n) obtained for each change pattern $C_k$ (where k=1, . . . , K; for example, K=1, . . . , 9) along with the magnitude of P(X(n)|S(n))P(S (n)|Sˆ(n−1), . . . , Sˆ(1), $C_k$) corresponding thereto.

The above-described various kinds of processing may be executed, in addition to being executed in chronological order in accordance with the descriptions, in parallel or individually depending on the processing power of a device that executes the processing or when needed. In addition, it goes without saying that changes may be made as appropriate without departing from the spirit of the present invention.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present device are implemented as a result of a predetermined program being executed on the computer, but at least part of these processing functions may be implemented by hardware.

DESCRIPTION OF REFERENCE NUMERALS

11 model learning device
12 estimating device

What is claimed is:

1. A model learning device comprising processing circuitry configured to:
    obtain, for a plurality types of predetermined change patterns of a plurality of states of satisfaction, a plurality of state-of-satisfaction change pattern models each including a set of transition weights in a plurality of state sequences of the plurality of states of satisfaction of each of the predetermined change patterns by using state-of-satisfaction change pattern correct values indicating correct values of change patterns of state of satisfactions of an utterer in a conversation and state-of-satisfaction correct values, each indicating a correct value of the state of satisfaction of the utterer at the time of each utterance in the conversation, and output the state-of-satisfaction change pattern models;
    obtain, by using an utterance-for-learning feature amount and a correct value of a state of satisfaction of an utterer who gave an utterance for learning corresponding to the utterance-for-learning feature amount, a state-of-satisfaction estimation model for obtaining a posteriori probability of an utterance feature amount given a state of satisfaction of an utterer, and output the state-of-satisfaction estimation model; wherein
    the state-of-satisfaction change pattern models and the state-of-satisfaction estimation model are input to an estimating device,
    the estimating device
    receives a plurality of utterances given by a particular utterer in a conversation,
    detects one or more voice activities in each of the plurality of utterances received, and
    by using an input utterance feature amount extracted, based on the detected one or more voice activities, and the state-of-satisfaction change pattern models and the state-of-satisfaction estimation model, obtains an estimated value of a state of satisfaction of the particular utterer who provided the plurality of utterances to the estimating device and outputs the estimated value.

2. The model learning device according to claim 1, wherein
    the states of satisfaction include any one of states: satisfaction, average, and dissatisfaction, and
    the change patterns include any one of
    (1) a pattern in which the state of satisfaction changes from average to satisfaction,
    (2) a pattern in which the state of satisfaction changes from average to dissatisfaction and then changes to satisfaction,
    (3) a pattern in which the state of satisfaction changes from dissatisfaction to satisfaction,
    (4) a pattern in which average continues,
    (5) a pattern in which the state of satisfaction changes from average to dissatisfaction and then changes to average,
    (6) a pattern in which dissatisfaction continues,
    (7) a pattern in which the state of satisfaction changes from average to dissatisfaction,
    (8) a pattern in which the state of satisfaction changes from dissatisfaction to average, and
    (9) a pattern in which satisfaction continues.

3. The model learning device according to claim 1, wherein
    a state-of-satisfaction change pattern model structure is the state sequence of the states of satisfaction, and
    the processing circuitry obtains, for the plurality types of the change patterns, the plurality of the state-of-satisfaction change pattern models by using the same state-of-satisfaction change pattern model structure for all the change patterns and outputs the state-of-satisfaction change pattern models.

4. An estimating device comprising processing circuitry comprising processing circuitry configured to:
    receive the state-of-satisfaction change pattern models and the state-of-satisfaction estimation model of any one of claims 1 to 3;
    receive a plurality of utterances given by a particular utterer in a conversation;
    detect one or more voice activities in each of the plurality of utterances; and by using an input utterance feature amount, based on the detected one or more voice activities, and the state-of-satisfaction change pattern models and the state-of-satisfaction estimation model, obtain an estimated value of a state of satisfaction of an utterer who provided the plurality of utterances to the estimating device and output the estimated value.

5. A model learning method of a model learning device, the model learning method, executed by processing circuitry, comprising:

obtaining, for a plurality types of predetermined change patterns of a plurality of states of satisfaction, a plurality of state-of-satisfaction change pattern models each including a set of transition weights in a plurality of state sequences of the plurality of states of satisfaction of each of the predetermined change patterns by using state-of-satisfaction change pattern correct values indicating correct values of change patterns of state of satisfactions of an utterer in a conversation and state-of-satisfaction correct values, each indicating a correct value of the state of satisfaction of the utterer at the time of each utterance in the conversation, and outputting the state-of-satisfaction change pattern models; and obtaining, by using an utterance-for-learning feature amount and a correct value of a state of satisfaction of an utterer who gave an utterance for learning corresponding to the utterance-for-learning feature amount, a state-of-satisfaction estimation model for obtaining a posteriori probability of an utterance feature amount given a state of satisfaction of an utterer, and outputting the state-of-satisfaction estimation model, wherein the state-of-satisfaction change pattern models and the state-of-satisfaction estimation model are input to an estimating device, the estimating device receives a plurality of utterances given by a particular utterer in a conversation, detects one or more voice activities in each of the plurality of utterances, and by using an input utterance feature amount extracted, based on the detected one or more voice activities, and the state-of-satisfaction change pattern models and the state-of-satisfaction estimation model, obtains an estimated value of a state of satisfaction of the particular utterer who provided the plurality of utterances to the estimating device and outputs the estimated value.

6. The model learning method according to claim 5, wherein a state-of-satisfaction change pattern model structure is the state sequence of the states of satisfaction, and the state-of-satisfaction change pattern model learning step obtains, for the plurality types of the change patterns, the plurality of the state-of-satisfaction change pattern models by using the same state-of-satisfaction change pattern model structure for all the change patterns and outputs the state-of-satisfaction change pattern models.

7. An estimating method of an estimating device, the estimating method, executed by processing circuitry, comprising:

receiving the state-of-satisfaction change pattern models and the state-of-satisfaction estimation model of claim 5 or 6;

receiving a plurality of utterances given by a particular utterer in a conversation;

detecting one or more voice activities in each of the plurality of utterances; and by using an input utterance feature amount, based on the detected one or more voice activities, and the state-of-satisfaction change pattern models and the state-of-satisfaction estimation model, obtaining an estimated value of a state of satisfaction of an utterer who provided the plurality of utterances to the estimating device and outputting the estimated value.

8. A non-transitory computer-readable recording medium storing a program for causing a computer to execute the model learning device according to claim 5 or 6.

9. A non-transitory computer-readable recording medium storing a program for causing a computer to execute the estimating method according to claim 7.

* * * * *